United States Patent
Price et al.

(10) Patent No.: US 12,399,811 B2
(45) Date of Patent: Aug. 26, 2025

(54) MEMORY POOLING, PROVISIONING, AND SHARING

(71) Applicant: MemVerge, Inc., Milpitas, CA (US)

(72) Inventors: Gregory Price, Silver Spring, MA (US); Steve Scargall, Mead, CO (US); Ryan Willis, San Jose, CA (US); Chenggong Fan, Saratoga, CA (US)

(73) Assignee: MemVerge, Inc., Milpitas, CA (US)

( * ) Notice: Subject to any disclaimer, the term of this patent is extended or adjusted under 35 U.S.C. 154(b) by 0 days.

(21) Appl. No.: 18/358,622

(22) Filed: Jul. 25, 2023

(65) Prior Publication Data

US 2024/0037026 A1 Feb. 1, 2024

Related U.S. Application Data

(60) Provisional application No. 63/503,647, filed on May 22, 2023, provisional application No. 63/394,257, filed on Aug. 1, 2022.

(51) Int. Cl.
*G06F 12/02* (2006.01)
*G06F 12/0815* (2016.01)

(52) U.S. Cl.
CPC ........ *G06F 12/023* (2013.01); *G06F 12/0815* (2013.01)

(58) Field of Classification Search
CPC ........ G06F 12/023; G06F 12/02; G06F 12/14; G06F 12/0862; G06F 12/1466; G06F 12/1425; G06F 12/145; G06F 12/1458; G06F 12/0646; G06F 12/0891; G06F 12/0238; G06F 12/1009; G06F 12/1072; G06F 13/1673; G06F 13/16;

(Continued)

(56) References Cited

U.S. PATENT DOCUMENTS

2020/0322287 A1* 10/2020 Connor ................ H04L 47/32
2021/0311643 A1* 10/2021 Shanbhogue ......... G06F 3/0679

(Continued)

OTHER PUBLICATIONS

Dr. Debendra Das Sharma and Ishwar Agarwal, "Compute Express Link™: The Breakthrough CPU-to-Device Interconnect CXL™," retrieved on Oct. 31, 2023 from https://www.computeexpresslink.org/, pp. 1-4.

*Primary Examiner* — Tracy C Chan
(74) *Attorney, Agent, or Firm* — Paradice & Li LLP

(57) ABSTRACT

This disclosure provides methods, devices, and systems for memory management. The present implementations more specifically relate to techniques for providing memory services over a CXL fabric. In some aspects, a memory management system may include an orchestration component, one or more host agents, and one or more endpoint controllers. Each host agent manages one or more memory services for a respective host computing device of a CXL system (or subsystem) and each endpoint controller manages one or more memory resources attached to a respective CXL device of the CXL system. The orchestration component coordinates with each host agent and endpoint controller to configure a CXL fabric to support the memory services provided to each host device. The memory management system receives updates associated with the memory services from each host device or CXL device and may dynamically reconfigure the CXL fabric based on the updates.

20 Claims, 9 Drawing Sheets

(58) Field of Classification Search
CPC .. G06F 9/30047; G06F 9/5016; G06F 9/5077; G06F 9/452; G06F 9/45558; G06F 9/44505; G06F 2212/1052; G06F 2212/7201; G06F 13/4234; G06F 13/1668; G06N 20/00
See application file for complete search history.

(56) References Cited

U.S. PATENT DOCUMENTS

| | | | |
|---|---|---|---|
| 2021/0374056 A1* | 12/2021 | Malladi | G06F 12/0891 |
| 2022/0114086 A1* | 4/2022 | Clark | G06F 9/5016 |
| 2022/0129356 A1* | 4/2022 | Dawkins | G06F 11/1469 |
| 2022/0206864 A1* | 6/2022 | Nadathur | G06F 8/63 |
| 2022/0207193 A1* | 6/2022 | Caraccio | G06F 21/79 |
| 2022/0405212 A1* | 12/2022 | Kakaiya | G06F 12/1425 |
| 2023/0017643 A1* | 1/2023 | Shah | G06F 12/0837 |
| 2023/0029074 A1* | 1/2023 | Chawla | G06F 11/0757 |
| 2023/0185716 A1* | 6/2023 | Awan | G06F 12/0831 |
| | | | 711/146 |
| 2023/0222067 A1* | 7/2023 | Ji | G06F 12/0891 |
| | | | 711/136 |
| 2023/0333756 A1* | 10/2023 | Mann | G06F 3/0673 |
| 2023/0350603 A1* | 11/2023 | Song | G06F 3/0622 |

\* cited by examiner

MEMORY POOLING, PROVISIONING, AND SHARING

CROSS-REFERENCE TO RELATED APPLICATION

This application claims priority and benefit under 35 USC § 119(e) to U.S. Provisional Patent Application No. 63/394,257, filed on Aug. 1, 2022, and to U.S. Provisional Patent Application No. 63/503,647, filed on May 22, 2023, which are incorporated herein by reference in their entireties.

TECHNICAL FIELD

The present implementations relate generally to memory management in computer systems, and specifically to techniques for memory pooling, provisioning, and sharing.

BACKGROUND OF RELATED ART

Memory is generally used to store data for quick or immediate access by a computer system or processing resource. Many computer systems include a memory controller that reads data from, and writes data to, memory on behalf of various processing resources. The physical media that carries the data between the memory controller and the memory resources is generally referred to as a "memory bus." Many existing memory buses (such as double data rate (DDR) memory buses) have physical constraints and timing protocols that require the memory resources to be located in relatively close proximity of the memory controller. As a result, many existing computer systems have local memory disposed on or within the computer system itself. Locally attached memory and processing resources are in the same "coherency domain."

New interconnect technologies are being developed to enable high-bandwidth, low-latency memory access over greater distances. For example, Compute Express Link (CXL) is an open standard interconnect that supports communications between a processor and memory over a Peripheral Component Interconnect Express (PCIe) link. As a result, CXL can extend coherency domains beyond small, localized fabrics to larger fabrics spanning multiple computer systems or remotely located devices. The CXL standard has led to improvements in memory usage and allocation (such as pooling of memory resources). As interconnect technologies continue to evolve, new memory management techniques are needed to support such advancements in memory usage and allocation.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented in a method of memory management. The method includes configuring a Compute Express Link (CXL) fabric based on a class of memory service associated with a first CXL subsystem that includes a first host computing device and a first CXL device; receiving updates associated with the memory service from the first host computing device or the first CXL device; and dynamically reconfiguring the CXL fabric based at least in part on the class of memory service associated with the first CXL subsystem and the updates received from the first host computing device or the first CXL device.

Another innovative aspect of the subject matter of this disclosure can be implemented in a memory management system, including a processing system and a memory. The memory stores instructions that, when executed by the processing system, cause the memory management system to configure a CXL fabric based on a class of memory service associated with a CXL subsystem that includes a host computing device and a CXL device; receive updates associated with the memory service from the host computing device or the CXL device; and dynamically reconfigure the CXL fabric based at least in part on the class of memory service associated with the CXL subsystem and the updates received from the host computing device or the CXL device.

BRIEF DESCRIPTION OF THE DRAWINGS

The present implementations are illustrated by way of example and are not intended to be limited by the figures of the accompanying drawings.

DETAILED DESCRIPTION

Figure 1:
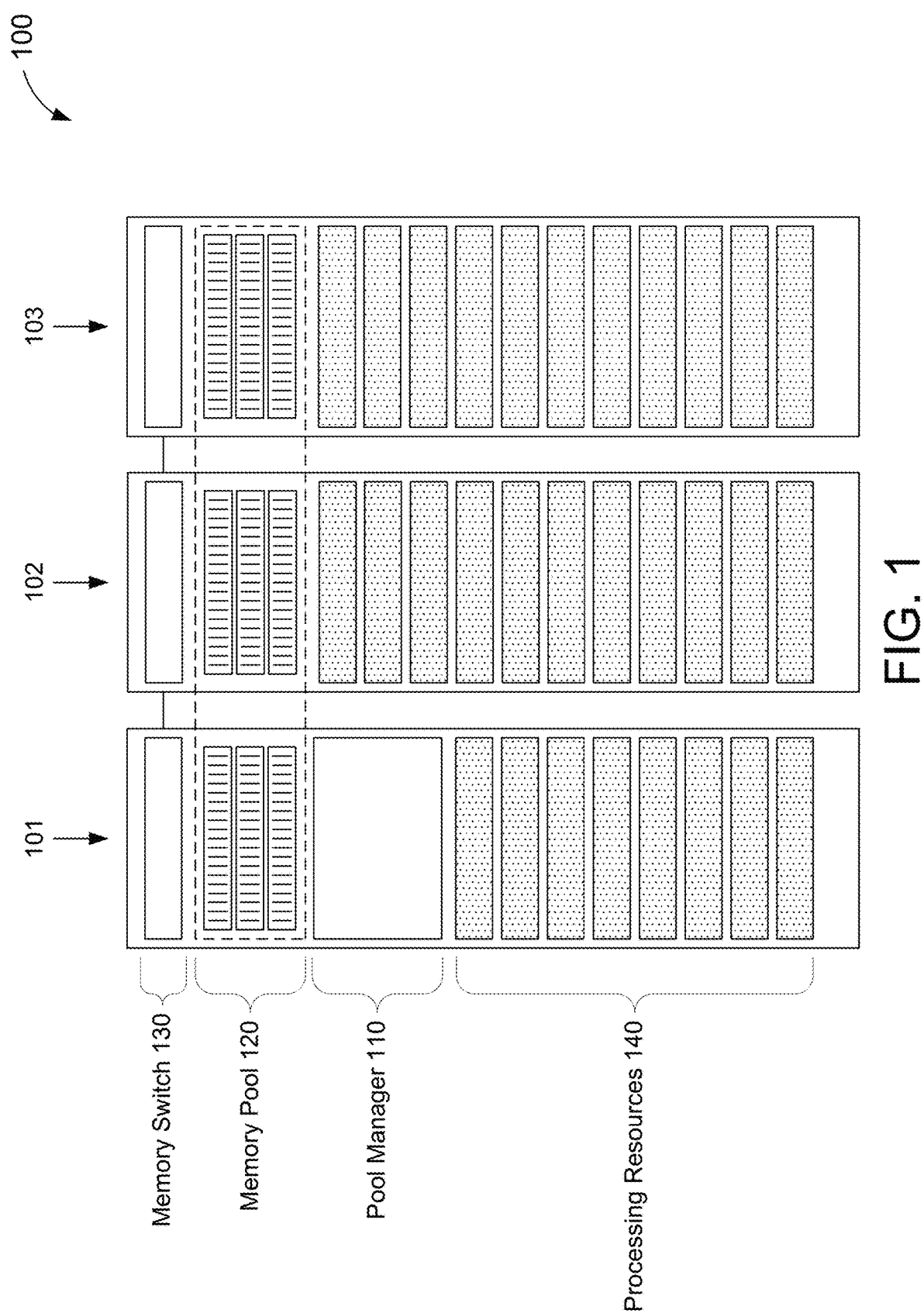
FIG. 1 shows a hardware diagram of an example computer system with pooled memory resources.

In the following description, numerous specific details are set forth such as examples of specific components, circuits, and processes to provide a thorough understanding of the present disclosure. The term "coupled" as used herein means connected directly to or connected through one or more intervening components or circuits. The terms "computer system," "electronic system," and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors (or a processing system). The term "processor," as used herein may refer to any general-purpose processor, special-purpose processor, conventional processor, controller, microcontroller, and/or state machine capable of executing scripts or instructions of one or more software programs stored in memory.

As described above, Compute Express Link (CXL) is an open standard interconnect that supports communications between a processor and memory over a Peripheral Component Interconnect Express (PCIe) link. A CXL system (or subsystem) includes a host computing device (also referred to simply as a "host device") and one or more CXL devices. The host device represents a root complex of the CXL system. A CXL device can be any endpoint device coupled to the host device directly or in a series of interconnected CXL devices (such as a switch). Example CXL devices include Type 1 devices (such as accelerator devices without any locally-attached memory), Type 2 devices (such as accelerator devices with locally-attached memory that can be accessed by the host device), and Type 3 devices (such as passive memory expansion devices). A CXL fabric is a collection of one or more switches that rely on Port Based Routing (PBR) messages to support flexible, low-latency switching between the host devices and CXL devices of a given CXL system over a variety of transport mediums and encapsulating protocols.

A coherency domain includes all memory and processing resources associated with a single coherent Host Physical Address (HPA) space. In existing computer systems, coherency domains were limited to small, localized fabrics built upon proprietary memory buses. The CXL standard defines a set of protocols that can be used to extend coherency domains to larger fabrics spanning multiple host devices, multiple CXL devices, or any combination thereof. As such, the CXL standard opens up new possibilities for storing and accessing data (such as memory pooling and sharing). Aspects of the present disclosure recognize that the speed and flexibility of the CXL architecture allows memory to be provided as a "service." As used herein, the term "memory service" refers to any combination of hardware or software that manages or monitors the storage of data, and access thereto, on behalf of one or more host devices. More specifically, memory services of the present implementations may leverage various capabilities and protocols supported by the CXL standard to improve or optimize the memory usage or performance of a CXL system.

Various aspects relate generally to memory management, and more particularly, to providing memory services over a CXL fabric. In some aspects, a memory management system may include an orchestration component, one or more host agents, and one or more endpoint controllers. Each host agent manages one or more memory services for a respective host computing device of a CXL system (or subsystem) and each endpoint controller manages one or more memory resources attached to a respective CXL device of the CXL system. The orchestration component coordinates with each host agent and endpoint controller to configure a CXL fabric to support the memory services provided to each host device. The memory management system receives updates associated with the memory services from each host device or CXL device and may dynamically reconfigure the CXL fabric based on the updates. In some implementations, the updates may indicate a performance of the CXL system, a data storage capacity associated with the CXL system, or a failure of one or more components of the CXL system. In some other implementations, the updates may include requests associated with an application executing on a host computing device.

Particular implementations of the subject matter described in this disclosure can be implemented to realize one or more of the following potential advantages. By dynamically configuring (and reconfiguring) a CXL fabric to support various memory services, aspects of the present disclosure may improve or optimize the memory usage or performance of a CXL system. In some implementations, the memory management system may support data protection services, for example, by provisioning memory attached to a CXL device for storing a copy of data already stored in memory attached to a host device (also referred to as a "snapshot"). In some other implementations, the memory management system may support data sharing services, for example, by provisioning memory attached to a CXL device for storing data to be shared by multiple host devices. In some other implementations, the memory management system may support capacity optimization services, for example, by provisioning memory attached to a CXL device for storing data associated with a particular memory tier. Still further, in some implementations, the memory management system may support memory pooling services, for example, by provisioning memory attached to a CXL device to be included as part of a memory pool.

FIG. 1 shows a hardware diagram of an example computer system 100 with pooled memory resources. The computer system includes a pool manager 110, a memory pool 120, a memory switch 130, and one or more processing resources 140. In some aspects, the processing resources 140 may include one or more computing servers.

The memory pool 120 may include any number of memory resources, such as volatile memory, non-volatile memory, or any combination thereof. In some implementations, the memory resources in the memory pool 120 may be distributed across different locations or devices. In the example of FIG. 1, a first portion of the memory pool 120 is disposed on a first server rack 101, a second portion of the memory pool 120 is disposed on a second server rack 102, and a third portion of the memory pool 120 is disposed on a third server rack 103. In some implementations, the number or types of memory resources disposed on each of the server racks 101-103 may vary. For example, the first portion of the memory pool 120 (disposed on the first server rack 101) may include a different number of memory resources than the second portion of the memory pool 120 (disposed on the second server rack 102).

The memory switch 130 serves as a memory access interface between the processing resources 140 and the memory pool 120. More specifically, the memory switch 130 may allow any of the processing resources 140 to write data to, or read data from, any of the memory resources in the memory pool 120 (regardless of their physical locations). For example, the memory switch 130 may facilitate memory access operations (such as read or write access) between processing resources 140 disposed on the first server rack 101 and memory resources disposed on any of the second or third server racks 102 or 103. In some implementations, the memory switch 130 may form at least part of a Compute Express Link (CXL) fabric conforming to the CXL open standard. For example, the memory switch 130 may be a CXL switch.

The pool manager 110 manages or maintains the memory pool 120. In some aspects, the pool manager 110 may dynamically provision memory resources in the memory pool 120 to be used by the processing resources 140. For example, the pool manager 110 may allocate a subset of memory resources from the memory pool 120 to a particular processing resource 140, when needed, and may deallocate the subset of memory resources when they are no longer needed by the particular processing resource 140. Aspects of the present disclosure recognize that some pages of memory may become locked (or "pinned") by a processing resource 140 for long-term or persistent use, which may prevent the processing resource 140 from releasing the entire extent of memory containing the pinned page.

In some implementations, the memory resources in the memory pool 120 may be dynamically allocated on a per-page or per-block basis. A block is a collection of one or more pages. For example, the pool manager 110 may map the entire memory pool 120 (or a portion thereof) to a group of processing resources 140 and may dynamically allocate (and deallocate) individual pages of memory associated with the memory pool 120 for individual processing resources 140 within the group. As a result, a processing resource 140 may provision a subset of memory pages associated with the memory pool 120, when needed, and may release (back into the memory pool 120) pages or blocks of memory that are no longer in use. More specifically, the processing resource 140 may continue to maintain memory blocks with any pinned pages or pages that are otherwise needed for future use.

In some other aspects, the pool manager 110 may allow sharing of memory resources in the memory pool 120. For example, the pool manager 110 may provision a set of memory resources from the memory pool 120 to be concurrently accessible to multiple processing resources 140 (such as for distributed computing or data processing applications). Still further, in some aspects, the pool manager 110 may transparently "heal" memory that is worn or is otherwise failing. For example, upon detecting one or more failing memory resources (such as indicated by an error rate associated with memory access operations), the pool manager 110 may provision new memory resources in the memory pool 120 to replace the failing memory resources and may proceed to migrate any data stored on the failing memory resources to the newly allocated memory resources.

Figure 2:
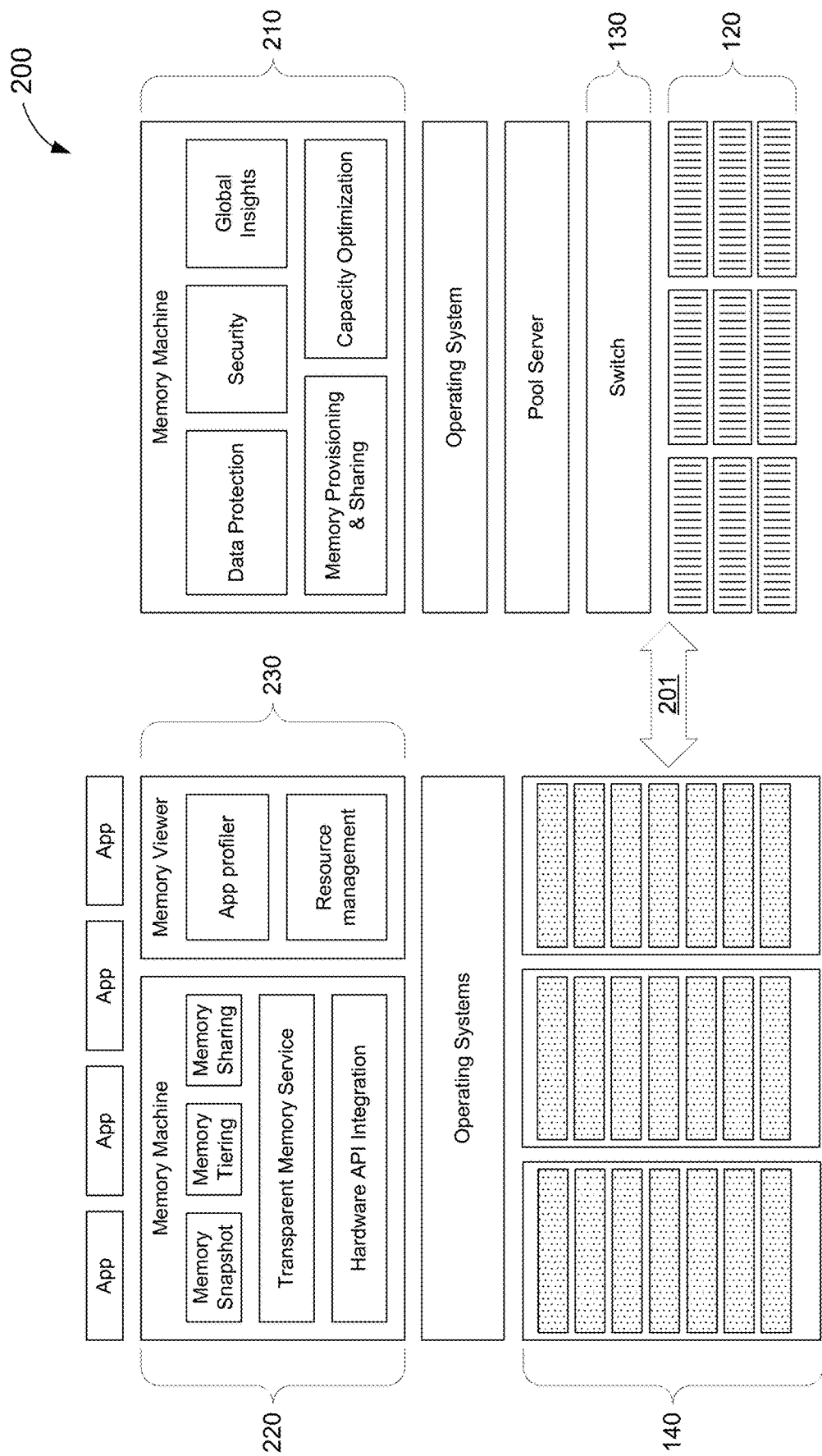
FIG. 2 shows a block diagram of an example computer system with pooled memory services, according to some implementations.

FIG. 2 shows a block diagram of an example computer system 200 with pooled memory services, according to some implementations. In some implementations, the computer system 200 may be one example of the computer system 100 of FIG. 1. For example, the computer system 200 is shown to include the memory pool 120, the switch 130, and the processing resources 140 of FIG. 1. As shown in FIG. 2, the processing resources 140 are coupled to the memory switch 130 via a high-bandwidth, low-latency interconnect 201. In some implementations, the interconnect 201 may be a Peripheral Component Interconnect Express (PCIe) link.

The computer system 200 further includes a pool manager 210, a memory machine 220, and a memory viewer 230. In some implementations, the pool manager 210 may be one example of the pool manager 110 of FIG. 1. As described with reference to FIG. 1, the pool manager 210 is configured to manage or maintain the memory pool 120. In some aspects, the pool manager 210 may provide a number of services in connection with managing the memory pool 120 (also referred to as "memory services"). Memory services can be categorized or classified according to various functionality, hardware, software, or performance requirements. Example memory service classes may include memory pooling services, memory sharing services, capacity optimization services, bandwidth optimization services, data protection services, security services, and global insights, among other examples. Thus, different classes of memory service may require different configurations of the CXL fabric. For example, memory sharing services may require multiple host devices to be able to communicate with the same memory (or CXL) device. On the other hand, capacity optimization services may require the same host device to be able to communicate with multiple memory (or CXL) devices.

In some implementations, the memory pooling services may include a service for partitioning the memory pool 120. For example, the pool manager 210 may maintain an allocation table that indicates which memory resources in the memory pool 120 have been allocated to which processing resources 140. In some other implementations, the memory pooling services may include a service for allocating an unshared memory partition to a system with orchestration of hot add (such as when new physical memory resources are added to the memory pool 120. In some other implementations, the memory pooling services may include a service for orchestrating hot remove and freeing memory partitions back to the memory pool 120. For example, the pool manager 210 may deallocate memory resources that are no longer in use by any of the processing resources 140. Still further, in some implementations, the memory pooling services may include a service for allocating a memory partition to multiple systems in a cluster and orchestrating page-level sub-allocation within that cluster-wide mapped pool (such as described with reference to FIG. 1).

In some implementations, the data protection services may include a service for capturing or acquiring a snapshot of memory. For example, the pool manager 210 may store a copy of the data in one or more memory resources in the memory pool 120 at any given time. In some other implementations, the data protection services may include a service for adding a check signature for each page of memory in a given snapshot. For example, the pool manager 210 may store a checksum that can be used to validate or otherwise detect errors in the snapshot for one or more pages of memory. In some other implementations, the data protection services may include a service for replicating N-of-M redundancy across independent memory failure domains. For example, the pool manager 210 may store a number (M) of units of data that includes a number (N) of units of original information plus redundancy, where any N data units of the M stored data units can be used to recover the original information in its entirety). Still further, in some implementations, the data protection services may include a service for serializing data to storage. For example, the pool manager 210 may copy data in the memory pool 120 to a data store such as, for example, an HDD or an SSD.

In some implementations, the memory sharing services may include a service for allocating a shared memory partition to multiple systems with orchestration of hot add and configuration of coherency ownership. For example, the pool manager 210 may maintain cache coherency for processing resources 140 that share concurrent access to the same subset of memory resources (such as described with reference to FIG. 1). In some other implementations, the memory sharing services may include a service for naming memory spaces. For example, the pool manager 210 may assign names to shared memory spaces within the memory pool 120 so that the shared memory spaces can be identified by name and mapped to a process address space, thus allowing the data stored in the named memory spaces to be shared by multiple data processes. Still further, in some implementations, the memory sharing services may include a service for cloning snapshots. For example, the pool manager 210 may provide a copy of a snapshot of the memory pool 120 to one or more processing resources 140 to allow the processing resources 140 to quickly bootup to a desired memory state or perform different processes or modifications on the stored data without losing the original "baseline" memory state.

In some implementations, the capacity optimization services may include a service for tiering to compressed memory. For example, the pool manager 210 may move data from the memory pool 120 to compressed memory, such as to optimize for cost, load, or various other factors. In some other implementations, the capacity optimization service may include a service for tiering to storage. For example, the pool manager 210 may move data from the memory pool 120 to a data store, such as to optimize for cost, load, or various other factors. In some other implementations, the capacity optimization service may include a service for tiering between different performance classes of memory. For example, the pool manager may coordinate with the Memory Machine 220 Memory Tiering data service to place "hot" (frequently accessed) data into memory local to the Processing Resource 140, while "cold" (infrequently accessed) data is placed into the memory pool 120. In some implementations, the security services may include a service for access control. For example, the pool manager 210 may prevent processing resources 140 from accessing data in the memory pool 120 to which they are not authorized. In some other implementations, the security services may include a service for managing transport encryption. For example, the pool manager 210 may add point-to-point encryption of data as it is communicated to or from the memory pool 120 (such as from one end of the interconnect 201 to another).

The memory machine 220 may reside with the processing resources 140 to implement various memory services supported by the pool manager 210 and provide hardware application programming interface (API) integration for the processing resources 140. In some implementations, the memory machine 220 may expand the memory capacity available to the processing resources 140 by providing a software-defined memory pool with intelligent auto-tiering. For example, the memory machine 220 may implement memory snapshot, memory tiering, or memory sharing services for individual processing resources 140. In some other implementations, the memory machine 220 may accelerate the time-to-discovery for the processing resources 140 by providing transparent checkpointing or other transparent memory services. For example, the memory machine 220 may allow a processing resource 140 to roll back, restore, or clone data from any of the memory resources in the memory pool 120 at any given time. Still further, in some implementations, the memory machine 220 may reduce the cost of cloud services by enabling long-running applications to use low-cost cloud automation instances or by integrating with cloud automation and scheduler to automatically recover from preemptions.

The memory viewer 230 is configured to provide system administrators (or users) with comprehensive insight into the physical topology of the memory pool 120 as well as how application memory is utilized. In some implementations, the memory viewer 230 may allow system administrators to ensure memory configuration accuracy by providing a real-time view of the memory configuration as well as the bandwidth of each type of memory hardware. For example, such information may be presented in a graphical user interface (GUI) that can be displayed to a user or system administrator. In some other implementations, the memory viewer 230 may help system administrators to optimize their memory configurations for a given workload by providing a heatmap that shows the memory usage patterns of different types of memory resources (with different access latencies). For example, the system administrator may implement memory tiering based on the information provided in the heatmap (such as by moving "cold" data that is infrequently used to lower-cost memory with higher access latencies).

Figure 3:
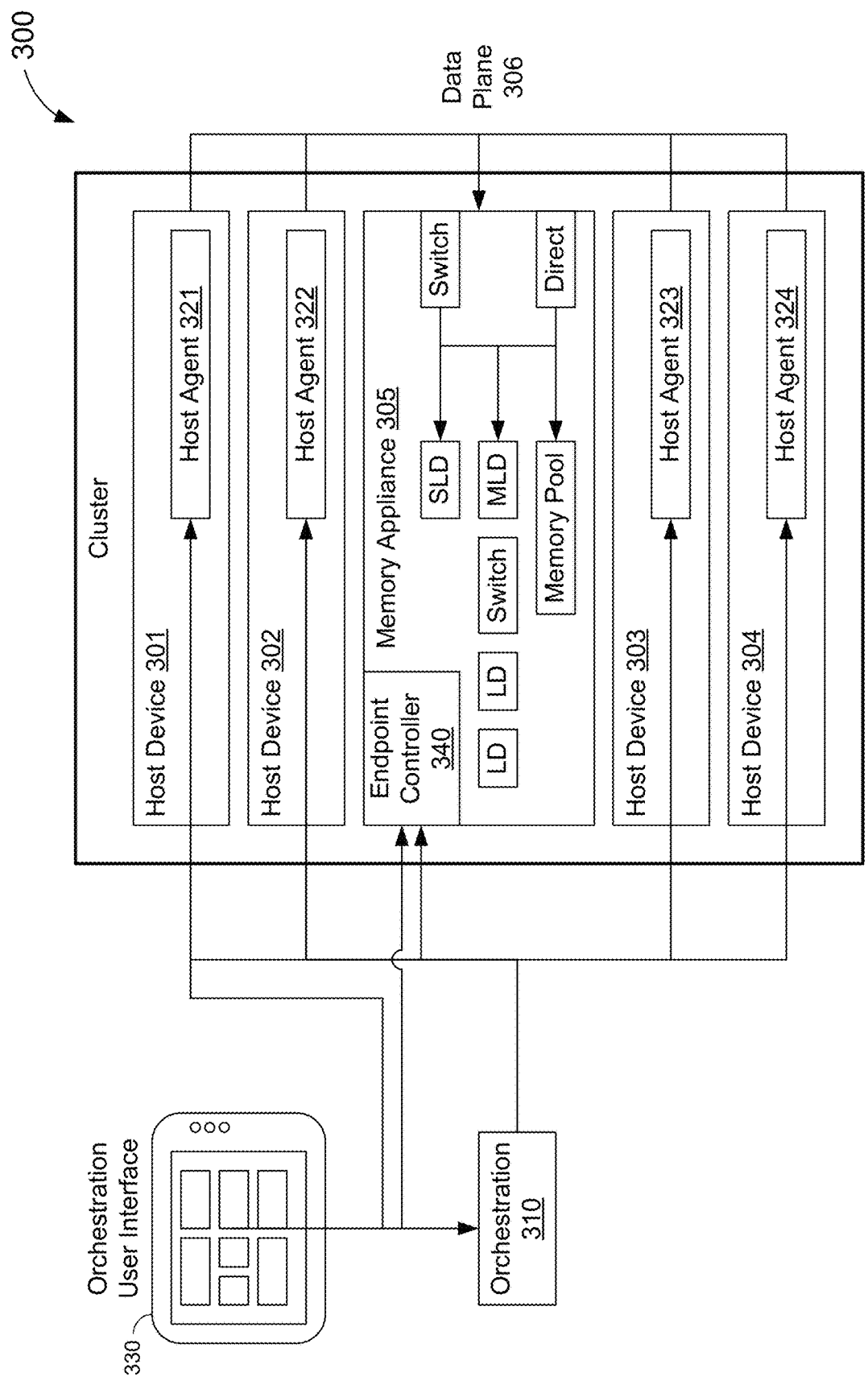
FIG. 3 shows a block diagram of an example memory management system, according to some implementations.

FIG. 3 shows a block diagram of an example memory management system 300, according to some implementations. In some implementations, the system 300 may be one example of any of the computer systems 100 or 200 of FIGS. 1 and 2, respectively. For example, the memory management system 300 may support pooling, sharing, or dynamically provisioning external memory for distributed processing resources. In the example of FIG. 3, the external memory is disposed on a memory appliance 305 and the processing resources are disposed on a number of host computing devices 301-304 communicatively coupled to the memory appliance 305 via a data plane 306.

The memory appliance 305 may be any device or hardware that aggregates or otherwise provides memory resources for access by an external host. In some aspects, the memory appliance may be a CXL device. With to FIGS. 1 and 2, the memory appliance 305 may be one example of the memory pool 120. In some implementations, the memory appliance 305 may not have any local processing resources (such as a Type 3 CXL device or memory expander). In some other implementations, the memory appliance 305 also may include local processing resources (such as Type 2 CXL device or a server). In such implementations, the external memory resources provided by the memory appliance 305 may include memory that is locally attached to one or more processing resources residing on the memory appliance 305.

The host computing devices 301-304 may include any device or hardware having local processing resources (such as a server) that can write data to, or read data from, the external memory provided by the memory appliance 305. In some aspects, each of the host computing devices 301-304 may represent a root complex of a respective CXL subsystem. With reference to FIGS. 1 and 2, the host computing devices 301-304 may be examples of the processing resources 140. The data plane 306 may include various physical or logical interconnects that support the transfer of data between the memory appliance 305 and the host computing devices 301-304. In some aspects, the data plane 306 may include a CXL fabric that conforms to the CXL open standard. With reference for example to FIGS. 1 and 2, the data plane 306 may include the memory switch 130, the interconnect 201, or any combination thereof.

In some aspects, the memory management system 300 may dynamically configure (and reconfigure) the data plane 306 to support various memory transactions and services between the memory appliance 305 and the host computing devices 301-304. As described with reference to FIGS. 1 and 2, example memory services may include, among other examples, memory pooling services (including capacity monitoring and resource provisioning), capacity optimization services (including performance monitoring and tiering), data sharing services (including software-enforced memory coherency), and data protection services (including user software snapshot). Although one memory appliance 305 and four host computing devices 301-304 are depicted in the example of FIG. 3, in actual implementations the memory management system 300 may dynamically configure the data plane 306 to support memory transactions and services between any number of memory appliances and any number of host computing devices (including multiple CXL systems or multiple CXL subsystems).

The memory management system 300 includes an orchestration component 310, host agents 321-324, an orchestration user interface (UI) 330, and endpoint controller 340. The endpoint controller 340 is configured to manage the memory resources disposed on, or attached to, the memory appliance 305. In some implementations, the endpoint controller 340 may reside or execute on the memory appliance 350. For example, the endpoint controller 340 may manage read or write access (by the host computing devices 301-304) to a memory pool or various logical devices (LDs), including single logical devices (SLDs) and multiple logical devices (MLDs), among other examples.

Each of the host agents 321-324 is configured to provide one or more memory services for a respective one of the host computing devices 301-304. In some implementations, the host agents 321-324 may reside or execute on the host computing devices 301-304, respectively, and may communicate with the endpoint controller 340 via the orchestration component 310. With reference to FIG. 2, each of the host agents 321-324 may be one example or instance of the memory machine 220. In some implementations, each of the host agents 321-324 may manage multiple components of each supported memory service, including core and data services. Core service components may provide interoperability with other components of the memory management system 300. Example core service components may include local databases, hardware driver support, or interconnect management software, among other examples. By contrast, data service components may provide non-core functionality. Example data service components may include performance monitoring, external memory provisioning, or software-coherency controls, among other examples.

The orchestration component 310 coordinates interactions between the endpoint controller 340 and the host agents 321-324. With reference to FIG. 2, the orchestration component 310 may be one example of the pool manager 210. In some implementations, the orchestration component 310 may manage a global shared state between disparate hosts. For example, the global shared state may include memory provisioning information indicating portions of the external memory resources (if any) that are owned by individual host computing devices 301-304 (such as where each of the host computing devices is associated with a different coherency domain). In some aspects, the orchestration component 310 may reside or execute on one of the host computing devices 301-304. In some other aspects, the orchestration component 310 may reside or execute on the memory appliance 305. Still further, in some aspects, the orchestration component 310 may reside or execute on a dedicated host computing device that does not include a host agent or endpoint controller.

The orchestration UI 330 may be any user interface (such as a GUI or command line) that can interact with the orchestration component 310, the host agents 321-324, or the endpoint controller 340 to provide external memory orchestration. With reference to FIG. 2, the orchestration UI 330 may be one example of the memory viewer 230. In some implementations, the orchestration UI 330 may be a web browser-based graphical software suite which communicates with other components of the memory management system 300 via hypertext transfer protocol (HTTP) requests. In some other implementations, the orchestration UI 330 may be a command line terminal software suite which communicates with other components of the memory management system 300 via remote procedure calls (RPCs). In some aspects, the orchestration UI 330 may reside or execute on the same computer system as the orchestration component 310. In some other aspects, the orchestration UI 330 may reside or execute on a personal computer that is communicatively coupled to the computer system executing the orchestration component 310 (such as via one or more networks).

In some aspects, the memory management system 300 may provide a hardware abstraction layer (HAL) or interface between the memory services and a CXL fabric that couples or otherwise interconnects the host computing devices 301-304 and the memory appliance 305. For example, the CXL standard defines a "fabric manager" that controls aspects of a CXL system related to binding and management of pooled ports and devices. More specifically, the CXL standard provides a fabric manager API that can be used to configure a CXL fabric. In some implementations, the orchestration component 310 (or other components of the memory management system 300) may implement or utilize the fabric manager API to dynamically configure (and reconfigure) the data plane 306 based on the needs or requests of the memory services. For example, the data plane 306 (or CXL fabric) can be used to provision memory resources in the memory appliance 305 for storing data associated with one or more of the host computing devices 301-304. In other words, the memory management system 300 exposes the features and capabilities of the of the CXL fabric to the memory services supported by the host computing devices 301-304.

Figure 4A:
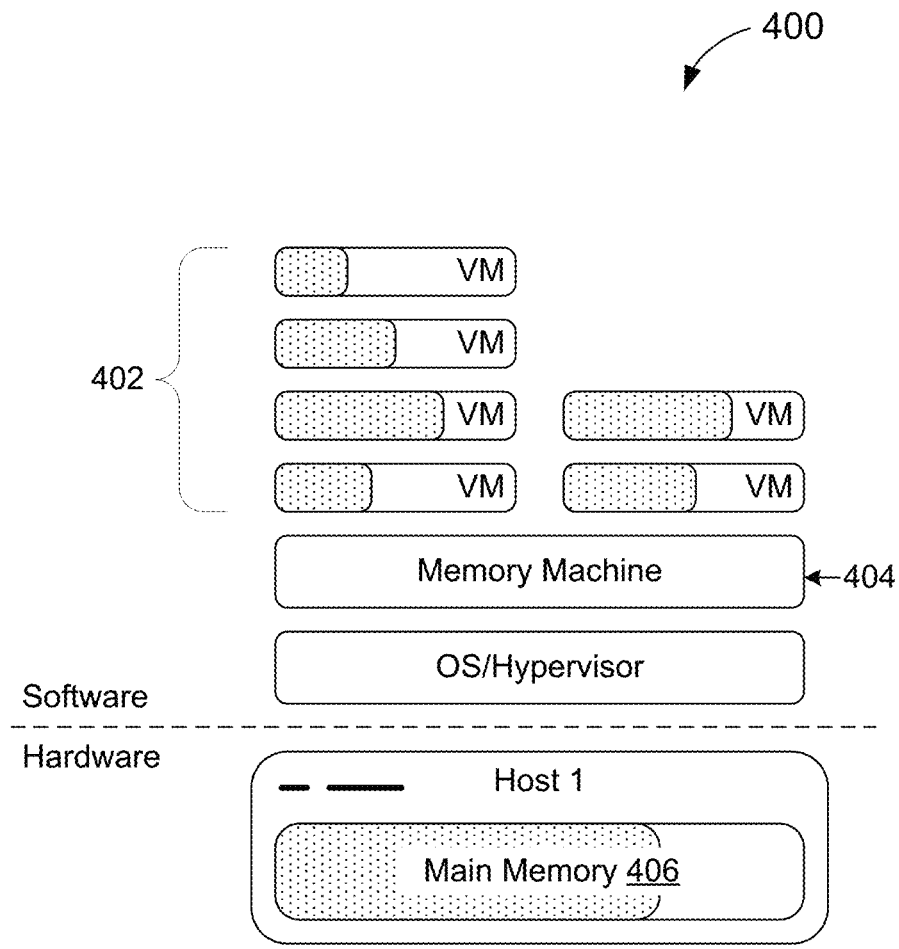
FIG. 4A shows an example computing environment with localized memory resources, according to some implementations.

FIG. 4A shows an example computing environment 400 with localized memory resources, according to some implementations. The computing environment 400 includes a host device (Host1) having locally attached main memory 406, a number (6) of virtual machines (VMs) 402 running on the host device Host1, and a memory machine 404. For example, the main memory 406 may include dynamic random access memory (DRAM). In some implementations, the computing environment 400 may be one example of the system 300 of FIG. 3. With reference to FIG. 3, the host device Host1 may be one example of any of the host computing devices 301-304 and the memory machine 404 may be one example of any of the instances of the host agent software 321-324 executing on the host computing devices 301-304, respectively.

In the example of FIG. 4A, the main memory 406 has sufficient capacity to support the number of VMs 402 concurrently running on the host device Host1. As such, the host device Host1 is said to operate in a "steady state." However, the number of VMs 402 running on the host device Host1 may vary over time. Moreover, the resource requirements of VMs 402 currently running on the host device Host1 also may vary over time. As a result, the memory requirements of the VMs 402 can exceed the capacity of the main memory 406 at any given time. If the data usage of the VMs 402 exceeds the memory allocation capacity of the host device Host1, at least some of the data in the main memory 406 may need to spill over to disk ("swap space") or engage memory compression, which can degrade the performance of the VMs 402. However, aspects of the present disclosure recognize that some workloads cannot spill over to swap space. As a result, some of the VMs 402 may run out of memory and terminate.

In some aspects, the memory machine 404 may prevent the VMs 402 from running out of memory by dynamically expanding the memory resources available to the host device Host1. In some implementations, the memory machine 404 may determine whether the memory requirements of the VMs 402 is about to exceed the available memory capacity of the main memory 406 based on user defined configurations or system runtime events. Example suitable system runtime events may include performance monitoring, job scheduling, and reliability, availability, and serviceability (RAS) information, among other examples. Upon determining that the memory requirements of the VMs 402 are about to exceed the available capacity of the main memory 406, the memory machine 404 may provision additional memory resources from a memory pool to satisfy the requirements of the VMs 402.

Figure 4B:
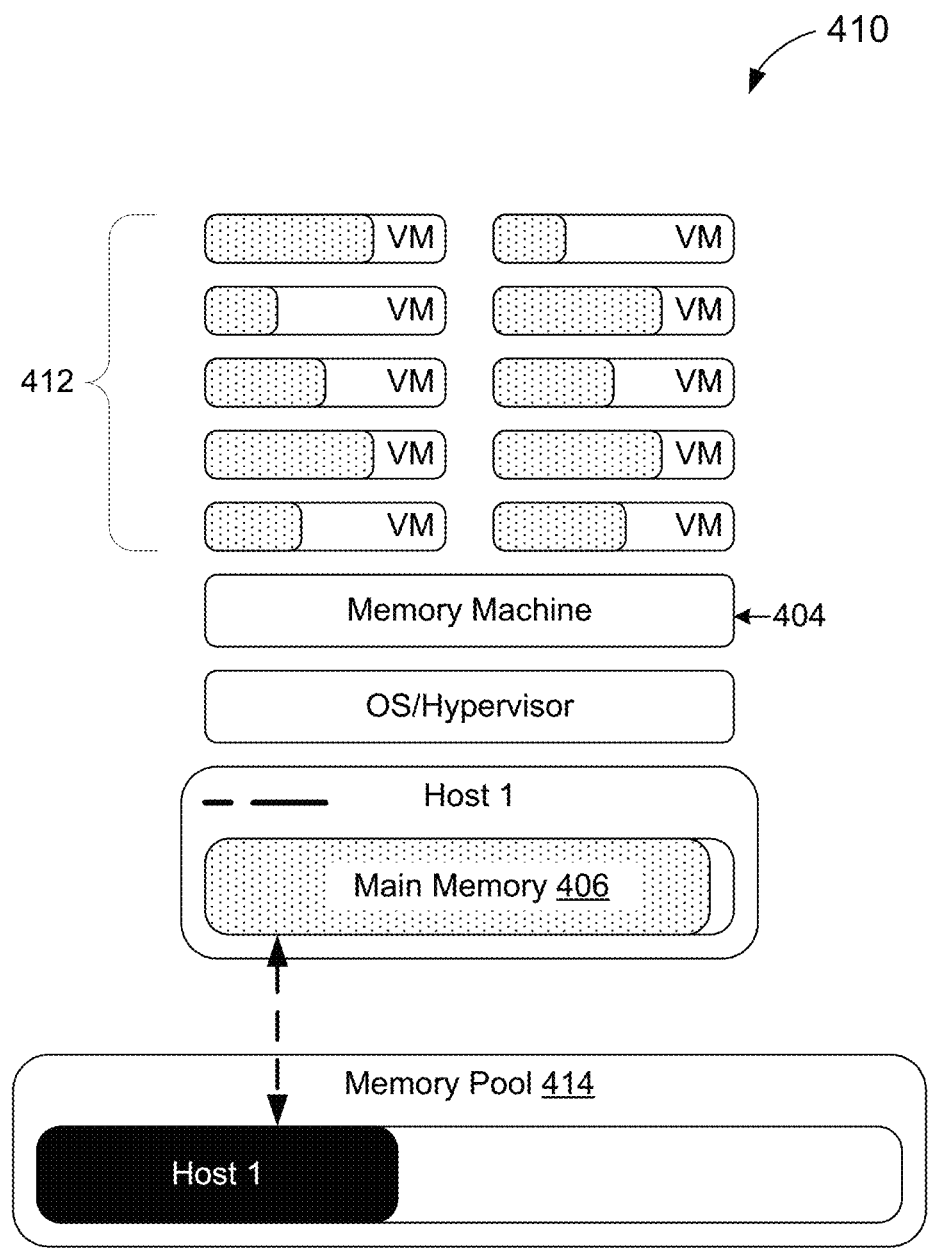
FIG. 4B shows an example computing environment with dynamic memory expansion, according to some implementations.

FIG. 4B shows an example computing environment 410 with dynamic memory expansion, according to some implementations. The computing environment 410 includes the host device Host1 having the locally attached main memory (such as DRAM) 406, a number (10) of VMs 412 running on the host device Host1, the memory machine 404, and a memory pool 414. In some implementations, the computing environment 410 may be one example of the system 300 of FIG. 3. With reference to FIG. 3, the host device Host1 may be one example of any of the host computing devices 301-304, the memory machine 404 may be one example of any of the instances of the host agent software 321-324 executing on the host computing devices 301-304, respectively, and the memory pool 414 may be one example of the memory appliance 305.

In the example of FIG. 4B, the memory requirements of the VMs 412 exceeds the memory capacity of the main memory 406. As a result, the memory machine 404 dynamically provisions memory resources from the memory pool 414 for the host device Host1. With reference for example to FIG. 3, the memory machine 404 may communicate with the orchestration software 310 and the endpoint device software 340 to access the memory pool provided by the memory appliance 305. Accordingly, the memory machine 404 can elastically (or "endlessly") expand the memory resources of the host device Host1. In some implementations, the amount of memory provisioned from the memory pool 414 for the host device Host1 may depend on the memory requirements of the VMs 412. As described with reference to FIG. 4A, the memory machine 404 may determine the memory requirements of the VMs 412 based on user defined configurations or system runtime events.

In some aspects, the memory machine 404 may release the external memory resources back into the memory pool 414 when the memory requirements of the VMs 402 diminishes. For example, the memory machine 404 may free the external memory resources when the memory requirements of the VMs 402 falls below the memory capacity of the main memory 406 (or some other threshold amount). With reference for example to FIG. 3, the memory machine 404 may communicate with the orchestration software 310 and the endpoint device software 340 to relinquish access to the memory pool provided by the memory appliance 305. As a result, the host device Host1 may return to operating in a steady state without memory pool 414 resources (such as shown in FIG. 4A).

Figure 5:
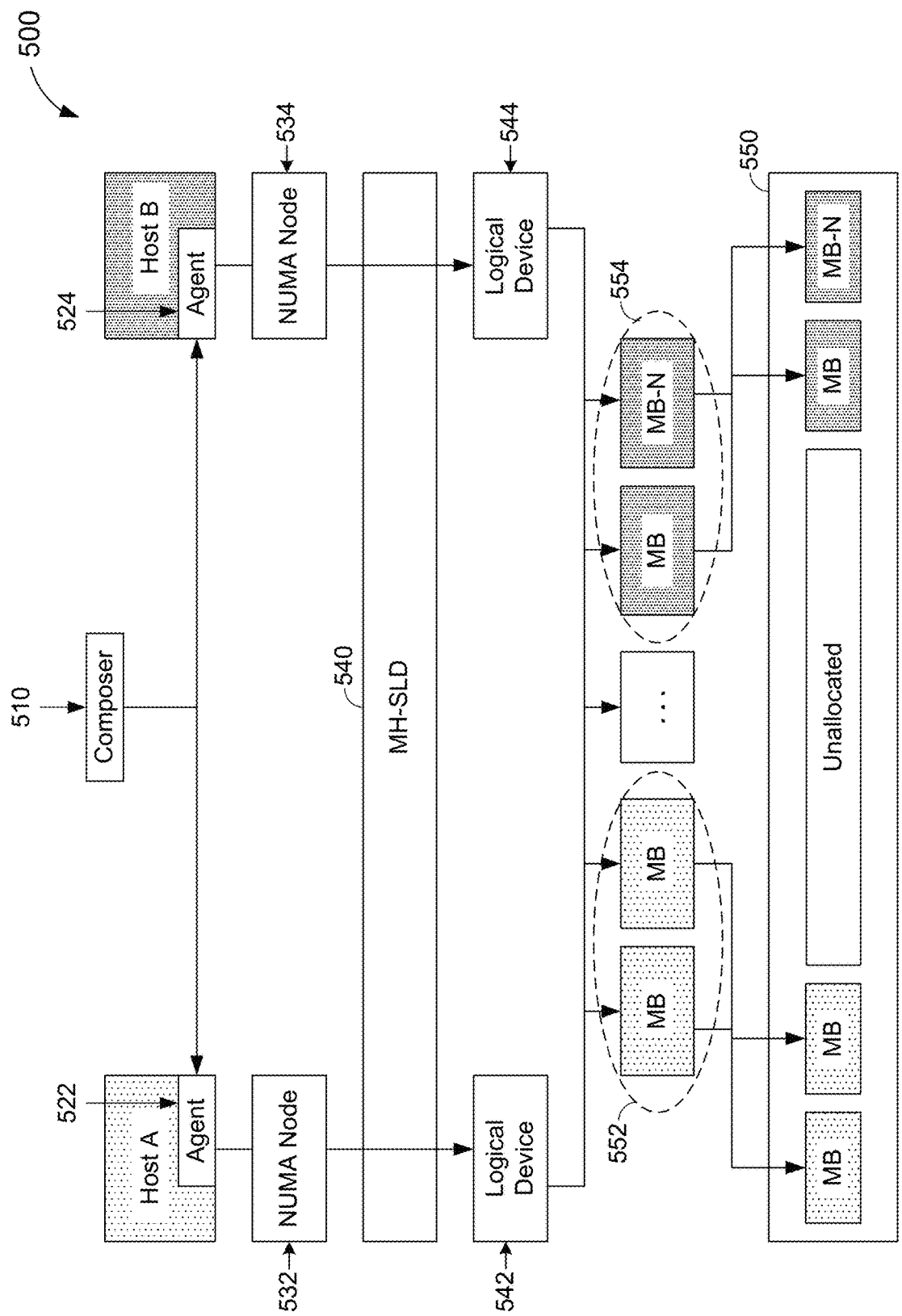
FIG. 5 shows a block diagram of an example computer system with dynamically expandable memory, according to some implementations.

FIG. 5 shows a block diagram of an example computer system 500 with dynamically expandable memory, according to some implementations. The computer system 500 includes a composer 510, a pair of host devices (Host A and Host B), host agent software 522 and 524 residing (or executing) on Host A and Host B, respectively, a pair of non-uniform memory access (NUMA) nodes 532 and 534, a multi-headed (MH) SLD 540, a pair of logical devices 542 and 544, and a memory pool 550. In some implementations, the MH-SLD 540 may be a CXL Switch based system hosting one or more CXL devices. In some implementations, the computer system 500 may be one example of the system 300 of FIG. 3. With reference to FIG. 3, the composer 510 may be one example of the orchestration software 310, the host devices Host A and Host B may be examples of the host computing devices 301-304, the host agent software 522 and 524 may be examples of the host agent software 321-324, and the memory pool 550 may be one example of the memory appliance 305.

The NUMA node 532 provides a shared memory interface between the logical device 542 and a cluster of processing resources disposed on Host A. Similarly, the NUMA node 534 provides a shared memory interface between the logical device 544 and a cluster of processing resources disposed on Host B. The MH-SLD 540 pools the processing resources of Host A and Host B by mapping the logical devices 542 and 544 to shared memory blocks (MBs) associated with the memory pool 550. As a result, any of the host devices Host A or Host B can access any of the MBs associated with the memory pool 550 at any given time. In some aspects, the composer 510 may coordinate with the host agent software 522 and 524 to enforce exclusivity among the MBs associated with the memory pool 550.

In some implementations, the host agent software 522 may dynamically toggle access to the MBs for the processing resources of Host A. More specifically, the host agent software 522 may dynamically expand or contract the number of MBs associated with the NUMA node 532. In some implementations, the host agent software 522 may determine which (if any) MBs to provision for Host A based on user defined configurations or system runtime events (such as described with reference to FIGS. 3-4B). In the example of FIG. the host agent software 522 provisions a first subset of MBs 552 for Host A. For example, the host agent software 522 may communicate with the composer 510 to access the memory pool 550. More specifically, the host agent software 522 may request read or write access to the particular subset of MBs 552 associated with the memory pool 550.

In some implementations, the host agent software 524 may dynamically toggle access to the MBs for the processing resources of Host B. More specifically, the host agent software 524 may dynamically expand or contract the number of MBs associated with the NUMA node 534. In some implementations, the host agent software 524 may determine which (if any) MBs to provision for Host B based on user defined configurations or system runtime events (such as described with reference to FIGS. 3-4B). In the example of FIG. the host agent software 524 provisions a second set of MBs 554 for Host B. For example, the host agent software 524 may communicate with the composer 510 to access the memory pool 550. More specifically, the host agent software 524 may request read or write access to the particular subset of MBs 554 associated with the memory pool 550.

Figure 6:
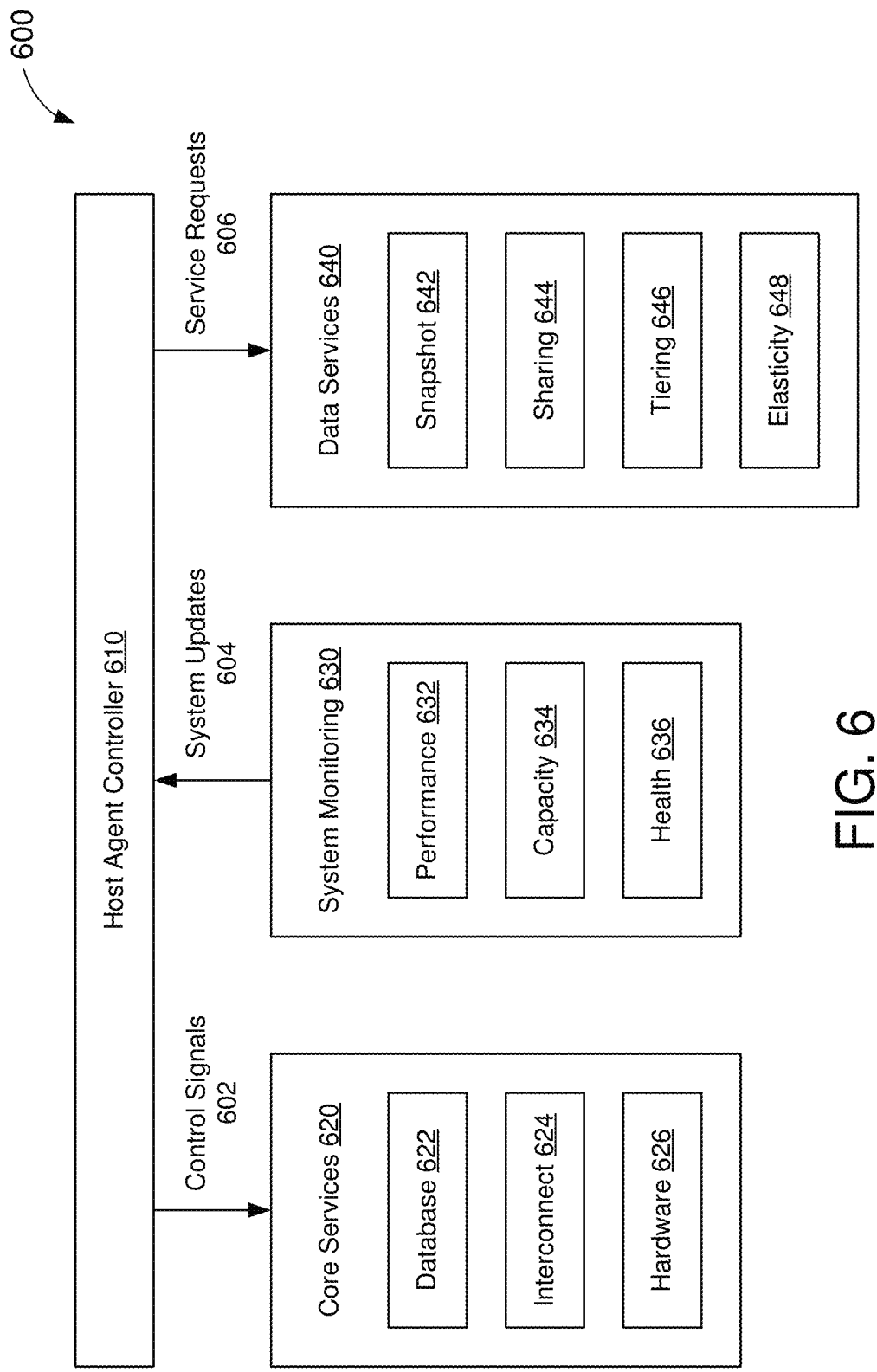
FIG. 6 shows a block diagram of an example host computing device, according to some implementations.

FIG. 6 shows a block diagram of an example host agent 600, according to some implementations. The host agent 600 is a component of a memory management system that provides one or more memory services (including core services and data services) for a host computing device of a CXL system or subsystem. For example, the host agent 600 may reside or execute on the respective host computing device. In some implementations, the memory management system may be one example of the memory management system 300 of FIG. 3. With reference for example to FIG. 3, the host agent 600 may be may one example of any of the host agents 321-324.

In some aspects, the host agent 600 may provide the memory services based, at least in part, on one or more external memory resources. As used herein, the term "external memory resource" may refer to any memory that is attached to a CXL device (such as the memory appliance 305 of FIG. 3) or is otherwise coupled to the host computing device via a CXL fabric (such as the data plane 306). In some implementations, the host agent 600 may dynamically configure (and reconfigure) the CXL fabric to facilitate data transactions or other communications between the host computing device and the external memory resources. The host agent 600 includes a host agent controller 610, a core services component 620, a system monitoring component 630, and a data services component 640. The host agent controller 610 manages interactions between the components 620, 630, and 640 of the host agent 600 and other components of the memory management system (such as the orchestration component 310 of FIG. 3) to implement the memory services supported by the host agent 600.

The core services component 620 enables the host agent 600 to access or communicate with other components of a CXL system (or subsystem). In some implementations, the core services component 620 may include a database management service 622, an interconnect management service 624, and a hardware management service 626. The database management service 622 is configured to manage a local database (on the host computing device) for storing data and other information associated with one or more memory services. The interconnect management service 624 is configured to create and manage pathways for routing data and other information through the CXL fabric. The hardware management service 626 is configured to manage various hardware drivers on the host computing device so that the host agent 600 can operate other hardware components of the CXL system. The core services component 620 may configure the database, interconnects, or hardware drivers responsive to control signals 602 from the host agent controller 610.

The system monitoring component 630 is configured to monitor various aspects of the host computing device or the CXL system (or subsystem). In some implementations, the system monitoring component 630 may include a performance monitoring service 632, a capacity monitoring service 634, and a health monitoring service 636. The performance monitoring service 632 is configured to monitor various performance metrics associated with the host computing device or the CXL system (such as a bandwidth, speed, latency, or power consumption of data transactions). The capacity monitoring service 634 is configured to monitor a storage capacity of any memory (or other data storage) available to the host computing device (including locally-attached memory or external memory resources). The health monitoring service 636 is configured to monitor a health of various hardware components of the host computing device (such as memory failures or other device or component failures). The system monitoring component 630 may report the monitored conditions to the host agent controller 610 via system updates 604.

The data services component 640 is configured to provide non-core services related to the management of data. In some implementations, the data services component 640 may include a memory snapshot service 642, a memory sharing service 644, a memory tiering service 646, and a memory elasticity service 648. The memory snapshot service 642 is configured to capture or acquire a snapshot of data stored in memory (such as locally-attached memory or external memory). The memory sharing service 644 is configured to manage or maintain one or more cache coherency states associated with any data stored in memory shared with other host computing devices. The memory tiering service 646 is configured to manage the movement or storage of data to different storage media based on various memory tiers. The memory elasticity service 648 is configured to dynamically allocate memory resources from a memory pool to the host computing device (and release the memory resources back into the memory pool). The data services component 640 may perform various actions associated with the data services responsive to service requests 606 from the host agent controller 610.

In the example of FIG. 6, the data services component 640 is shown to provide four data services for the host computing device. In some other implementations, the data services component 640 may provide fewer or more data services than those depicted in FIG. 6. As described with reference to FIG. 2, memory snapshot services, memory sharing services, memory tiering services, and memory elasticity services belong to different classes of memory services. More specifically, each of the data services may require the CXL fabric to be configured in a particular way (such as to provision specific memory resources suitable for the data service). In some aspects, the host agent 600 may configure the CXL fabric based, at least in part, on the class of memory service associated with each data service provide by the data services component 640.

In some implementations, to support memory snapshot services, the host agent controller 610 may produce one or more control signals 602 instructing the interconnect management service 624 to establish a data path, via the CXL fabric, from the host computing device to an external memory suitable for storing a snapshot of any data stored in locally-attached memory. The host agent controller 610 may further produce one or more service requests 606 instructing the memory snapshot service 642 to provision at least a portion of the external memory to be used for storing the snapshots of the locally-attached memory. Thereafter, the memory snapshot service 642 may capture or acquire snapshots of the data stored in the locally-attached memory (such as in response to various trigger conditions) and store the snapshots in the external memory.

In some implementations, to support memory sharing services, the host agent controller 610 may produce one or more control signals 602 instructing the interconnect management service 624 to establish a data path, via the CXL fabric, from the host computing device to an external memory suitable for storing data that can be shared among multiple host computing devices. The host agent controller 610 may further produce one or more service requests 606 instructing the memory sharing service 644 to provision at least a portion of the external memory to be used for sharing data between the host computing devices. Thereafter, the memory sharing service 644 may manage one or more cache coherency states associated with the data stored in the shared memory (such as in response to memory access requests initiated by the local host computing device or another host computing device having access to the shared memory).

In some implementations, to support memory tiering services, the host agent controller 610 may produce one or more control signals 602 instructing the interconnect management service 624 to establish a data path, via the CXL fabric, from the host computing device to an external memory associated with a different memory tier than the locally-attached memory. The host agent controller 610 may further produce one or more service requests 606 instructing the memory tiering service 646 to provision at least a portion of the external memory to be used for offloading data assigned to a lower (or higher) memory tier than that of the locally-attached memory. Thereafter, the memory tiering service 646 may move data between the locally-attached memory and the external memory based on various triggers that assign (or reassign) the data to different memory tiers.

In some implementations, to support elastic memory services, the host agent controller 610 may produce one or more control signals 602 instructing the interconnect management service 624 to establish a data path, via the CXL fabric, from the host computing device to an external memory associated with a memory pool. The host agent controller 610 may further produce one or more service requests 606 instructing the memory elasticity service 648 to provision at least a portion of the external memory to be used by one or more virtual machines (or tasks) executing on the host computing device. Thereafter, the memory elasticity service 648 may dynamically allocate (or release) resources from the memory pool based on the memory requirements of each virtual machine.

Aspects of the present disclosure recognize that updates associated with the data services may require the CXL fabric to be reconfigured (such as to provision new memory resources, deprovision existing memory resources, or otherwise rebalance or optimize memory usage). In some aspects, the host agent 600 may dynamically reconfigure the CXL fabric based on updates received from the host computing device or other device coupled to the CXL fabric (such as a CXL device or another host computing device). Example suitable updates include, among other examples, manual inputs received from a user of the host computing device (such as via the orchestration UI 330 of FIG. 3), performance-related events indicating a change in the performance of the CXL system, capacity-related events indicating a change in the storage capacity associated with the CXL system, health-related events indicating a change in the health of the CXL system, and various requests initiated by applications executing on the host computing device (such as the launch of a hypervisor or scheduler integration).

In some aspects, the host agent 600 may reconfigure the CXL fabric based on updates associated with memory snapshot services. For example, the host agent controller 610 may produce one or more control signals 602 instructing the interconnect management service 624 to tear down one or more existing data paths through the CXL fabric or to establish a new data path from the host computing device to another external memory or storage (such as an HDD or an SSD). Alternatively, or in addition, the host agent controller 610 may produce one or more service requests 606 instructing the memory snapshot service 642 to deprovision one or more external memory resources currently allocated to the host computing device or to provision other external memory resources to be used for storing snapshots of the locally-attached memory. In some implementations, the host agent controller 610 may produce one or more service requests 606 instructing the memory snapshot service 642 to offload a snapshot from external memory to a more permanent storage solution (such as HDD or SSD).

In some aspects, the host agent 600 may reconfigure the CXL fabric based on updates associated with memory sharing services. For example, the host agent controller 610 may produce one or more control signals 601 instructing the interconnect management service 624 to tear down one or more existing data paths through the CXL fabric or to establish a new data path from the host computing device to another external memory. Alternatively, or in addition, the host agent controller 610 may produce one or more service requests 606 instructing the memory sharing service 644 to deprovision one or more external memory resources currently allocated to the host computing device or to provision other external memory resources to be used for storing data shared by multiple host computing devices. In some implementations, the host agent controller 610 may produce one or more service requests 606 instructing the memory sharing service 644 to change the cache coherency states of one or more cache lines associated with any of the shared data.

In some aspects, the host agent 600 may reconfigure the CXL fabric based on updates associated with memory tiering services. For example, the host agent controller 610 may produce one or more control signals 601 instructing the interconnect management service 624 to tear down one or more existing data paths through the CXL fabric or to establish a new data path from the host computing device to another external memory or storage (such as an HDD or an SSD). Alternatively, or in addition, the host agent controller 610 may produce one or more service requests 606 instructing the memory tiering service 646 to deprovision one or more external memory resources currently allocated to the host computing device or to provision other external memory resources to be used for offloading data assigned to various memory tiers. In some implementations, the newly-provisioned memory resources may be associated with an even lower (or higher) memory tier than that of any memory resources currently allocated to the host computing device.

In some aspects, the host agent 600 may reconfigure the CXL fabric based on updates associated with elastic memory services. For example, the host agent controller 610 may produce one or more control signals 601 instructing the interconnect management service 624 to tear down one or more existing data paths through the CXL fabric or to establish a new data path from the host computing device to another external memory associated with the memory pool. Alternatively, or in addition, the host agent controller 610 may produce one or more service requests 606 instructing the memory elasticity service 648 to deprovision one or more external memory resources currently allocated to the host computing device or to provision other external memory resources from the memory pool. In some implementations, the elastic memory service 648 may dynamically expand the amount of memory available to the host computing device, from the memory pool, in response to increased memory usage or demand by virtual machines and may release memory back into the memory pool as usage or demand subsides.

Figure 7:
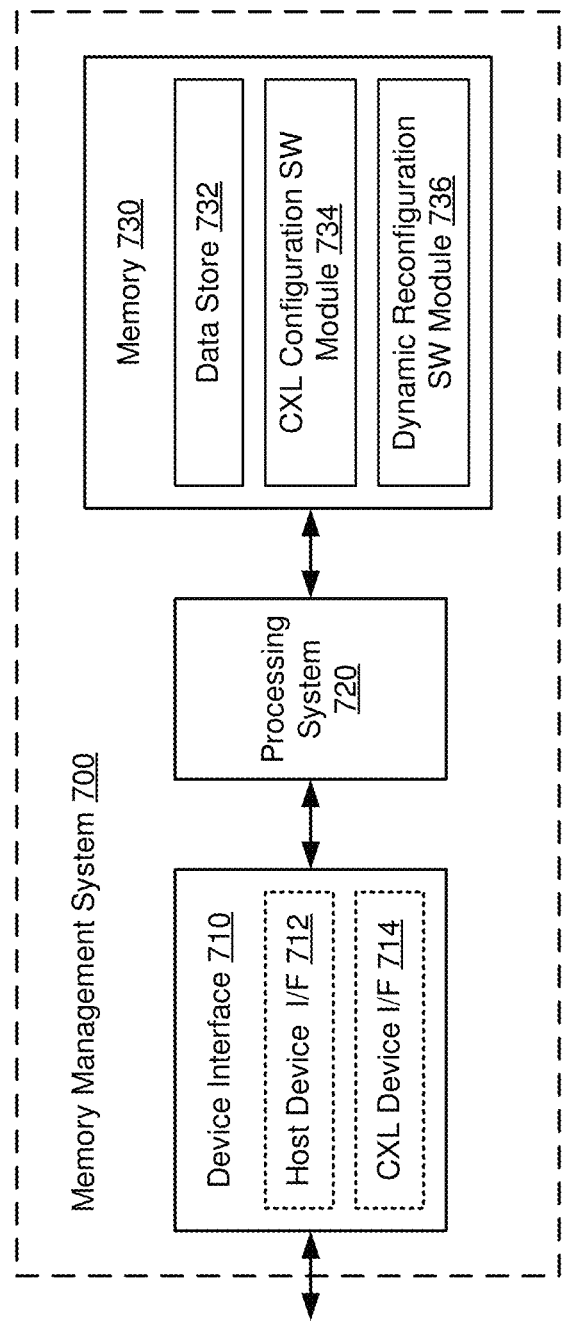
FIG. 7 shows another block diagram of an example memory management system, according to some implementations.

FIG. 7 shows another block diagram of an example memory management system 700, according to some implementations. The memory management system 700 is configured to provide one or more memory services over a CXL system. The CXL system may include one or more host computing devices and one or more CXL devices coupled via a CXL fabric. In some implementations, the memory management system 700 may be one example of the memory management system 300 of FIG. 3. With reference for example to FIG. 3, each host computing device may be one example of any of the host computing devices 301-304, the CXL device may be one example of the memory appliance 305, and the CXL fabric may be one example of the data plane 306.

The memory management system 700 includes a device interface 710, a processing system 720, and a memory 730. The device interface 710 is configured to communicate with one or more devices associated with the CXL system (such as the host computing devices or the CXL devices). For example, the device interface 710 may include a host device interface (I/F) 712 configured to communicate with a host computing device of a CXL subsystem and a CXL device interface (I/F) 714 configured to communicate with a CXL device of the CXL subsystem. In some implementations, the host device I/F 712 may receive updates associated with a memory service from the host computing device. In some implementations, the CXL device I/F 714 may receive updates associated with the memory service from the CXL device.

The memory 730 may include a data store 732 configured to store data and other information associated with to one or more memory services. The memory 730 also may include a non-transitory computer-readable medium (including one or more nonvolatile memory elements, such as EPROM, EEPROM, Flash memory, or a hard drive, among other examples) that may store at least the following software (SW) modules:

- a CXL configuration SW module 734 to configure a CXL fabric based on a class of memory service associated with the CXL subsystem; and
- a dynamic reconfiguration SW module 736 to dynamically reconfigure the CXL fabric based at least in part on the class of memory service associated with the CXL subsystem and the updates received from the host computing device or the CXL device.

Each software module includes instructions that, when executed by the processing system 720, causes the memory management system 700 to perform the corresponding functions.

The processing system 720 may include any suitable one or more processors capable of executing scripts or instructions of one or more software programs stored in the memory management system 700 (such as in the memory 730). For example, the processing system 720 may execute the CXL configuration SW module 734 to configure a CXL fabric based on a class of memory service associated with the CXL subsystem. The processing system 720 also may execute the dynamic reconfiguration SW module 736 to dynamically reconfigure the CXL fabric based at least in part on the class of memory service associated with the CXL subsystem and the updates received from the host computing device or the CXL device.

Figure 8:
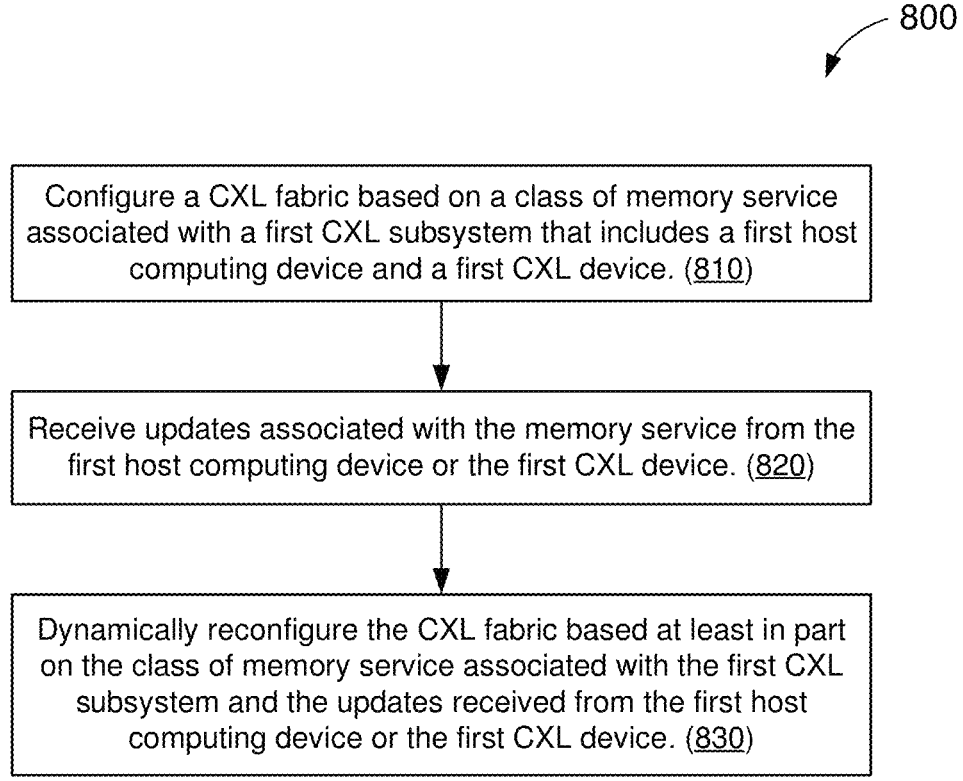
FIG. 8 shows an illustrative flowchart depicting an example operation for memory management, according to some implementations.

FIG. 8 shows an illustrative flowchart depicting an example operation 800 for memory management, according to some implementations. In some implementations, the example operation 800 may be performed by a memory a management system such as the memory management system 300 of FIG. 3 or the memory management system 700 of FIG. 7.

The memory management system configures a CXL fabric based on a class of memory service associated with a first CXL subsystem that includes a first host computing device and a first CXL device (810). The memory management system further receives updates associated with the memory service from the first host computing device or the first CXL device (820). The memory management system dynamically reconfigures the CXL fabric based at least in part on the class of memory service associated with the first CXL subsystem and the updates received from the first host computing device or the first CXL device (830).

In some implementations, the updates received from the first host computing device or the first CXL device may indicate a performance of the first CXL subsystem, a data storage capacity associated with the first CXL subsystem, or a failure of one or more components of the first CXL subsystem. In some other implementations, the updates received from the first host computing device may include requests associated with an application executing on the first host computing device.

In some aspects, the configuring of the CXL fabric may include provisioning a first memory for storing data associated with the first host computing device. In some implementations, the first memory may be attached to the first CXL device.

In some implementations, the class of memory service may be a data protection service. In such implementations, the configuring of the CXL fabric further include provisioning a second memory for storing a snapshot of the data in the first memory. In such implementations, the reconfiguring of the CXL fabric may include provisioning a storage device for offloading the snapshot of the data from the second memory.

In some other implementations, the class of memory service may be a data sharing service. In such implementations, the first memory may be provisioned for storing data shared by the first host computing device and a second host computing device associated with a second CXL subsystem. In such implementations, the reconfiguring of the CXL fabric may include modifying one or more cache coherency states associated with the shared data in the first memory.

In some other implementations, the class of memory service may be a capacity optimization service. In such implementations, the first memory may be associated with a first memory tier of a plurality of memory tiers. In such implementations, the reconfiguring of the CXL fabric may include provisioning a second memory for offloading at least some of the data from the first memory, where the second memory is associated with a second memory tier of the plurality of memory tiers representing a different performance class of memory than the first memory tier. In some other implementations, the reconfiguring of the CXL fabric may include provisioning a storage device for offloading at least some of the data from the first memory or the second memory.

Still further, in some implementations, the class of memory service may be a memory pooling service. In such implementations, the first memory may be associated with a memory pool that includes a plurality of memory devices. In such implementations, the reconfiguring of the CXL fabric may include provisioning a second memory in the memory pool for storing data associated with the first host computing device.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of memory management, comprising:
provisioning a first memory associated with a Compute Express Link (CXL) fabric to store data associated with a first host computing device;
determining a requirement of a first class of memory service of a plurality of classes of memory service for providing first memory management functionality on behalf of the first host computing device, the plurality of classes of memory service associated with a first CXL subsystem that includes the first host computing device and a first CXL device;
configuring the CXL fabric in a first configuration of a plurality of predetermined configurations based on the requirement of the first class of memory service;
receiving updates associated with the first class of memory service from the first host computing device or the first CXL device;
determining, based on the updates, a requirement of a second class of memory service of the plurality of classes of memory service for providing second memory management functionality on behalf of the first host computing device; and
dynamically reconfiguring the CXL fabric in a second configuration of the plurality of predetermined configurations based on the requirement of the second class of memory service.

2. The method of claim 1, wherein the updates received from the first host computing device or the first CXL device indicate a performance of the first CXL subsystem, a data storage capacity associated with the first CXL subsystem, or a failure of one or more components of the first CXL subsystem.

3. The method of claim 1, wherein the updates received from the first host computing device include requests associated with an application executing on the first host computing device.

4. The method of claim 1, wherein the first memory is attached to the first CXL device.

5. The method of claim 1, wherein the second class of memory service comprises a data protection service, the reconfiguring of the CXL fabric comprising:
provisioning a second memory for storing a snapshot of the data in the first memory.

6. The method of claim 5, wherein the reconfiguring of the CXL fabric further comprises:
provisioning a storage device for offloading the snapshot of the data from the second memory.

7. The method of claim 5, wherein the second class of memory service is a capacity optimization service, the first memory being associated with a first memory tier of a plurality of memory tiers.

8. The method of claim 7, wherein the reconfiguring of the CXL fabric comprises:
provisioning a third memory for offloading at least some of the data from the first memory, the third memory being associated with a second memory tier of the plurality of memory tiers representing a different performance class of memory than the first memory tier.

9. The method of claim 8, wherein the reconfiguring of the CXL fabric comprises:
provisioning a storage device for offloading at least some of the data from the first memory or the third memory.

10. The method of claim 1, wherein the second class of memory service comprises a data sharing service, the first memory being provisioned for storing data shared by the first host computing device and a second host computing device associated with a second CXL subsystem, and wherein the reconfiguring of the CXL fabric comprises:
modifying one or more cache coherency states associated with the shared data in the first memory.

11. The method of claim 1, wherein the second class of memory service comprises a memory pooling service, the first memory being associated with a memory pool that includes a plurality of memory devices, wherein the reconfiguring of the CXL fabric comprises:
provisioning a second memory in the memory pool for storing data associated with the first host computing device.

12. The method of claim 1, wherein configuring and reconfiguring the CXL fabric includes rebalancing memory resources associated with the host computing device so that the memory management functionality provided by the respective class of memory service is supported.

13. The method of claim 12, wherein rebalancing the memory resources includes tearing down an existing data path through the CXL fabric.

14. The method of claim 12, wherein rebalancing the memory resources includes establishing a new data path through the CXL fabric from the host computing device to an external memory or storage.

15. The method of claim 12, wherein rebalancing the memory resources includes provisioning and/or deprovisioning one or more external memory resources.

16. A memory management system comprising:
a processing system; and
a memory storing instructions that, when executed by the processing system, causes the memory management system to:
provision a memory associated with a Compute Express Link (CXL) fabric to store data associated with a host computing device;
determine a requirement of a first class of memory service of a plurality of classes of memory service for providing first memory management functionality on behalf of the host computing device, the plurality of classes of memory service associated with a first CXL subsystem that includes the host computing device and a first CXL device;
configure the CXL fabric in a first configuration of a plurality of predetermined configurations based on the requirement of the first class of memory service;
receive updates associated with the first class of memory service from the host computing device or the CXL device;
determine, based on the updates, a requirement of a second class of memory service of the plurality of classes of memory service for providing second memory management functionality on behalf of the first-host computing device; and
dynamically reconfigure the CXL fabric in a second configuration of the plurality of predetermined configurations based on the requirement of the second class of memory service.

17. The memory management system of claim 16, wherein the updates received from the host computing device or the CXL device indicate a performance of the CXL subsystem, a data storage capacity associated with the CXL subsystem, or a failure of one or more components of the CXL subsystem.

18. The memory management system of claim 16, wherein the updates received from the host computing device include requests associated with an application executing on the host computing device.

19. The memory management system of claim 16, wherein the memory associated with the CXL fabric is attached to the CXL device.

20. The memory management system of claim 16, wherein the class of memory service comprises a data protection service, a data sharing service, a capacity optimization service, or a memory pooling service.

* * * * *